United States Patent [19]

Kojima et al.

[11] Patent Number: 5,358,777
[45] Date of Patent: Oct. 25, 1994

[54] MAGNETIC RECORDING MEDIUM COMPRISING AN UNDERLAYER OF NON MAGNETIC POWDER AND BINDER RESIN AND A MAGNETIC LAYER WITH A SPECIFIED YOUNG'S MODULUS

[75] Inventors: Masaya Kojima; Satoru Hayakawa; Toshio Kawamata, all of Kanagawa, Japan

[73] Assignee: Fuji Photo Film Co., Ltd., Kanagawa, Japan

[21] Appl. No.: 19,257

[22] Filed: Feb. 18, 1993

[30] Foreign Application Priority Data

Feb. 18, 1992 [JP] Japan .................................. 4-060939

[51] Int. Cl.$^5$ .............................................. G11B 05/00
[52] U.S. Cl. ..................................... 428/212; 428/336; 428/694 BS; 428/694 BH; 428/900
[58] Field of Search ............... 428/212, 336, 694, 900, 428/694 BS, 694 BU, 425.9, 694 BH

[56] References Cited

U.S. PATENT DOCUMENTS

| | | | |
|---|---|---|---|
| 4,863,793 | 9/1989 | Ogawa et al. | 428/323 |
| 4,874,633 | 10/1989 | Komatsu et al. | 427/48 |
| 4,952,444 | 8/1990 | Kawamata et al. | 428/141 |
| 4,963,433 | 10/1990 | Ogawa et al. | 428/323 |
| 5,066,534 | 11/1991 | Goto et al. | 428/212 |

*Primary Examiner*—Stevan A. Resan
*Attorney, Agent, or Firm*—Sughrue, Mion, Zinn, Macpeak & Seas

[57] ABSTRACT

A magnetic recording medium comprising (A) a non-magnetic support; (B) a non-magnetic layer comprising mainly a non-magnetic powder and a binder resin; and (C) a magnetic layer comprising mainly a ferromagnetic powder and a binder resin, wherein said non-magnetic layer is coated on said non-magnetic support; and said magnetic layer is coated over the previously formed non-magnetic layer while the previously formed non-magnetic layer is still wet; the thickness of the magnetic layer is 0.6 μm or less; the Young's Modulus of the magnetic layer is from 50% to 95% of the Young's Modulus of the non-magnetic layer, and the glass transition temperature of the magnetic layer is lower than that of the non-magnetic layer. The magnetic recording medium has good electromagnetic characteristics and excellent running stability and running durability. It is suitable as a disc medium for high-density recording at a shortest recording wavelength of 1.5 μm or less, displaying excellent overwriting characteristic in high-density recording. The running reliability of the magnetic recording medium is good.

7 Claims, No Drawings

MAGNETIC RECORDING MEDIUM COMPRISING AN UNDERLAYER OF NON MAGNETIC POWDER AND BINDER RESIN AND A MAGNETIC LAYER WITH A SPECIFIED YOUNG'S MODULUS

FIELD OF THE INVENTION

The present invention relates to a magnetic recording medium for high-density recording and, in particular, to a magnetic disc for recording data of high capacity.

BACKGROUND OF THE INVENTION

Different types of magnetic recording mediums are used in various fields, for example, video tapes, audio tapes and computers, since they have various excellent recording characteristics, and are superior to any other recording systems. For instance, the characteristics are such that repeated use of the medium is possible, that conversion of signals into electronic codes is easy so that construction of systems in combination with peripheral electronic devices is possible, and that correction of signals may be effected simply. Further improvement and elevation of the recording density of such a recording medium has heretofore been always desired in order to satisfy the current requirements of provision of small-sized devices, elevation of the quality of recording and reproducing signals, prolongation of the time of recording and enlargement of the recording capacity.

For this reason, various means have been tried, including the improvement of magnetic powders (substances) themselves, improvement of the surface property of the magnetic layer, and improvement of the dispersibility and the degree of filling (i.e., packing density) of magnetic powders in the magnetic layer.

In order to elevate the output by reducing the thickness loss and self-demagnetization during recording and reproduction, reducing the thickness of the magnetic layer to 1.0 μm or less is known to be effective for elevating the density and capacity scales of a magnetic recording medium. In particular, reduction of the thickness of the magnetic layer has come to be important in the field of video tapes for providing VTR video tapes applicable to high-vision VTR devices, reduction in thickness is also important in the field of magnetic recording discs for digital recording, such as floppy discs which recently must have a high capacity of 10 M bytes or more with the recent popularity of personal computers. This is because of the elevation of the capacity of application software and increase of the information data to be processed, especially for elevating the capacity of the magnetic recording medium in accordance with the reduction of the track width of the magnetic head in view of the necessity of elevation of the output and of improvement of the overwriting characteristic. In a magnetic recording medium for computers such as floppy discs, overwriting of recording signals each having a different magnetic wavelength is necessary. For this, heretofore, overwriting of two kinds of signals, the $1f$ signal and the $2f$ signal, which are in such a relation that the frequency of the latter is two times of that of the former, has been considered to be satisfactory. However, for high-capacity magnetic recording discs of 10 M bytes or more which have recently been in demand, not only shortening of the recording wavelength but also overwriting of plural signals falling a broad range of the frequency ratio of $\frac{3}{2}$ or more, such as RLL signals, is desired. Where plural signals each having a short recording wavelength and having large difference in the recording frequency between them are used, mere improvement of the electromagnetic characteristics of the magnetic layer in the manner as disclosed in JP-A-58-122623 and JP-A-61-74137 (the term "JP-A" as used herein means an "unexamined published Japanese patent application") is limited and insufficient so as to sufficiently overwrite the signal with a short recording wavelength over the signal with a long recording wavelength.

This is because even though a shorter wavelength recording signal is overwritten over the previously recorded longer wavelength signal in the conventional magnetic layer having a thickness of 1.0 μm or more, the magnetic force line of the shorter wavelength recording signal could not reach the deep area of the magnetic layer so that the previously recorded longer wavelength signal could not be erased.

With the elevation of the recording density in the current magnetic recording medium, the gap of the magnetic head to be applied thereto has become narrowed. Accordingly, sufficient recording in the direction of the thickness of the medium has become difficult.

In order to overcome the above-mentioned problems, if the magnetic layer is reduced to less than 1 μm, the magnetic layer could easily be peeled off with dropout occurring. In addition, there are other problems such as that the running durability of the medium could not be ensured and the reliability of it lowers.

U.S. Pat. No. 4,952,444 (corresponding to JP-A-62-214513) discloses definition of the Young's Modulus of the non-magnetic layer to improve the running durability of the medium. However, if the thickness of the magnetic layer is further reduced to 0.6 μm or less, the running durability of the medium cannot fully be satisfied only by the disclosed technique.

SUMMARY OF THE INVENTION

An object of the present invention is to provide a magnetic recording medium having good electromagnetic conversion characteristics and having excellent running stability and running durability and, in particular, to provide a magnetic recording disc medium for high-density recording having excellent overwriting characteristics with high recording density and having excellent running reliability, to which a short recording wavelength of 1.5 μm or less is applicable.

In order to overcome the problems in the prior art and to attain the above-mentioned object, the present invention provides a magnetic recording medium comprising (A) a non-magnetic support; (B) a non-magnetic layer comprising mainly a non-magnetic powder and a binder resin; and (C) a magnetic layer comprising mainly a ferromagnetic powder and a binder resin, wherein said non-magnetic layer is coated on said non-magnetic support; said magnetic layer is coated over the previously formed non-magnetic layer while the previously formed non-magnetic layer is still wet; the thickness of the magnetic layer is 0.6 μm or less; the Young's Modulus of the magnetic Layer is from 50% to 95% of the Young's Modulus of the non-magnetic layer, and the glass transition temperature of the magnetic layer is lower than that of the non-magnetic layer.

Specifically, the present invention provides a magnetic recording medium having a non-magnetic layer and a magnetic layer as provided on a non-magnetic support in this order, which is characterized in that-the-thickness of the magnetic layer is defined to be 0.6 μm or less and that the Young's Modulus of the magnetic layer is defined to be from 50% to 95% of the Young's Modulus of the non-magnetic layer.

DETAILED DESCRIPTION OF THE INVENTION

In order to improve the running durability of a magnetic recording medium composed of a non-magnetic layer having a certain thickness (hereinafter often referred to as a "lower layer") and an extremely thin magnetic layer having a thickness of 0.6 μm or less (hereinafter referred to as an "upper layer"), it has been found important, according to the present invention, for the Young's Modulus of the magnetic layer is to be controlled to be smaller than that of the non-magnetic layer. Specifically, it has been found necessary that the mechanical characteristic of the magnetic layer is made more flexible in some degree than that of the non-magnetic layer. As an analogy, if the Young's Modulus of the upper magnetic layer is larger than that of the lower non-magnetic layer without satisfying the preceding condition, the constitution would be such that a thin glass sheet as put on a sponge is easy broken. From this, the effect of the constitution of the present invention is easily understood.

By specifically defining the relation between the Young's Modulus of the lower layer and that of the upper layer in accordance with the present invention, peeling or scratching of the upper magnetic layer, even though it is extremely thin, may be prevented and the high-density overwriting characteristic of the magnetic layer and the recording capacity of the same are improved and additionally the mechanical strength of the layer, especially that to the magnetic head, is stabilized, so that the running durability of the layer is improved.

As a concrete means for satisfying the defined relation between the Young's Modulus of the magnetic layer and that of the non-magnetic layer in the present invention, specific selection of the composition of the magnetic layer coating solution and that of the non-magnetic layer coating solution is important. For instance, for the magnetic layer coating solution, the kinds and proportions of the ferromagnetic powder, binder resin, crosslinking agent (e.g. , polyisocyanate) , abrasive, carbon black and lubricant of constituting the solution are specifically selected and defined; and for the non-magnetic layer coating solution, the kinds and proportions of the non-magnetic layer (especially, inorganic powder, carbon black), binder resin, crosslinking agent (e.g., polyisocyanate), abrasive and lubricant are specifically selected and defined. More precisely, the kinds and proportions of the binder resin and polyisocyanate are selected and adjusted, and the kinds, shapes and particle sizes and amounts of the ferromagnetic powder and non-magnetic powder are selected and adjusted. Control of the relation between the Young's Modulus of the magnetic layer and that of the non-magnetic layer may relatively easily effected by combination of the selection and adjustment.

In addition, control of the relation between the glass transition temperature of the magnetic layer and that of the non-magnetic layer is also effective as an index for the control and adjustment of the relation between the Young's Moduli of the two layers.

The Young's Moduli of the magnetic layer and the non-magnetic layer of constituting the medium of the present invention are calculated out from the following expressions.

$$Ea = (E1.T1 + E2a.T2a)/(T1 + T2a)$$

$$Eb = (E1.T1 + E2b.T2b)/(T1 + T2b)$$

where $Ea$ = Young's Modulus of non-magnetic layer,
$E1$ = Young's Modulus of non-magnetic support,
$T1$ = thickness of non-magnetic support,
$E2a$ = Young's Modulus of non-magnetic support and non-magnetic layer formed thereon,
$T2a = T1$ + thickness of non-magnetic layer,
$Eb$ = Young's Modulus of magnetic layer,
$E2b$ = Young's Modulus of non-magnetic support and magnetic layer formed thereon, and
$T2b = T1$ + thickness of magnetic layer.

In the expressions, $E1$, $E2a$ and $E2b$ each indicate the Young's Modulus of the lengthwise direction (i.e., the long direction) or the widthwise direction (i.e., the width direction). Accordingly, $Ea$ and $Eb$ of the present invention are obtained as those each corresponding to the two directions.

$E1$, $E2a$ and $E2b$ are obtained by the use of a tensile testing machine (universal tensile testing machine of STM-T-50BP Model, manufactured by Toyo Boldwin Co.) at a tensile speed of 10%/min as the elongation of the lengthwise or widthwise direction of the whole length of the sample, at 23° C. and 70% RH; and the Young's Modulus at the lengthwise or widthwise direction is obtained from the 0.5% elongation value under the condition. From the above-mentioned calculations, $Ea$ and $Eb$ for each direction are obtained.

In the present invention, therefore, the relation of $Eb \leq 0.95 \times Ea$ is satisfied, and the respective coating solution compositions for the above-mentioned two layers are prepared so as to satisfy the relation. $Eb$ is desired to fall within the range of $0.5 \times Ea \leq Eb \leq 0.95 \times Ea$.

If $Eb$ is more than $0.95 \times Ea$, the durability of the medium is unfavorably low. If $Eb$ is less than $0.5 \times Ea$, the magnetic layer would easily be broken to unfavorably lower the durability of the medium.

The Young's Modulus of the non-magnetic layer, $Ea$ is preferably from $1 \times 10^4$ to $15 \times 10^4$ kg/cm$^2$, more preferably from $3 \times 10^4$ to $9 \times 10^4$ kg/cm$^2$, both in the lengthwise direction and in the widthwise direction. The Young's Modulus of the magnetic layer, $Eb$ is preferably from $0.95 \times 10^4$ to $14.25 \times 10^4$ kg/cm$^2$, more preferably from $2.85 \times 10^4$ to $8.55 \times 10^4$ kg/cm$^2$, both in the lengthwise direction and in the widthwise direction.

The Young's Modulus at 0.5% elongation of the magnetic recording medium of the present invention is, as measured by the above-mentioned method, preferably from $0.1 \times 10^4$ to $15 \times 10^4$ kg/cm$^2$, more preferably from $4.0 \times 10^4$ to $6.5 \times 10^4$ kg/cm$^2$, both in the lengthwise direction and in the widthwise direction.

$T1$ is preferably from 1 to 100 μm, more preferably from 20 to 85 μm. $E1$ is preferably from $3.5 \times 10^4$ to $10 \times 10^4$ kg/cm$^2$, more preferably from $4.0 \times 10^4$ to $6.5 \times 10^4$ kg/cm$^2$. The thickness of the non-magnetic layer ($T2a$-$T1$) is preferably from 0.5 to 10 μm, more preferably from 0.5 to 5 μm. The thickness of the magnetic layer ($T2b$-$T1$) is 0.6 μm or less, preferably from 0.05 μm to 1.2 times of the gap length of the recording head, more preferably from 0.05 to 0.6 μm and most preferably from 0.05 μm to 0.5 μm.

In the present invention, the glass transition temperature (Tgb) of the magnetic layer is desired to be lower than the glass transition temperature (Tga) of the non-magnetic layer. Tgb is preferably from 30° to 150° C., especially preferably from 55° to 120° C. Tga is preferably from 40° to 160° C., especially preferably from 40° to 130° C. If Tgb is higher than Tga, the non-magnetic layer would easily broken at the interface between the magnetic layer and the non-magnetic layer so that the durability of the medium would unfavorably be poor.

The glass transition temperature is measured by the method discussed below.

The coating solution for the upper layer (i.e., the magnetic layer) and the lower layer (i.e., the lower magnetic layer) are separately coated on one side surface of a polyimide film having a width of 30 cm and a thickness of 15 μm to have a dry thickness of 10 μm. After dried and press-shaped by dry calendar rolling, samples for measurement of the glass transition temperature are prepared. The sample is then applied to Rheovibron (manufactured by Toyo Boldwin Co.), with which the glass transition temperature of the sample is measured under the condition of a frequency of 110 Hz and a temperature elevating speed of 2° C./min.

The ferromagnetic powder to be in the magnetic layer of the magnetic recording medium of the present invention may be anyone of an iron oxide ferromagnetic powder, a ferromagnetic metal powder and a ferromagnetic hexagonal ferrite powder (preferably a ferromagnetic metal powder and a ferromagnetic hexagonal ferrite powder). Where a ferromagnetic metal powder or a ferromagnetic hexagonal ferrite powder having a small particle size to be suitable to a high-density magnetic recording medium is used as a ferromagnetic powder to be in a magnetic layer, the durability of the layer is known to often be poor. However, the magnetic recording medium of the present invention is free from the problem of the poor durability.

Where a ferromagnetic metal powder is used in the magnetic layer of the magnetic recording medium of the present invention, the particle size thereof is preferably such that the specific surface area is from 30 to 60 $m^2/g$ and that the particle crystallite size to be obtained by X-ray diffraction is from 100 to 300 Å. If the specific surface area is too small, the magnetic recording medium is not suitable for high-density recording. If it is too large, however, dispersion of the powder cannot be suitably effected so that a magnetic layer with a smooth surface cannot be formed. Thus, the case of having too small or too large a specific surface area, the medium cannot be beneficially applied to high-density recording.

The crystallite size is obtained from the range of the half value width of the diffraction line at the (1,1,0) plane and (2,2,0) plane.

Where a ferromagnetic hexagonal ferrite powder is used in the magnetic layer, the specific surface area of the powder is from 25 to 50 $m^2/g$, the tabular ratio (tabular diameter/tabular thickness) is from 2 to 6, and the tabular diameter is from 0.02 to 1.0 μm. Because of the same reasons as the preceding discussion on ferromagnetic metal powder, high-density recording would be difficult if the particle size is too large or too small.

As the ferromagnetic metal powder for use in the present invention, preferred is a powder at least containing Fe. Specifically, there are mentioned single metals or alloys consisting essentially of Fe, Fe-Co, Fe-Ni or Fe-Ni-Co. For elevating the recording density of the magnetic recording medium of the present invention, the magnetic powder to be therein must have a small particle size as mentioned above. In addition, regarding the electro-magnetic characteristics of the magnetic powder, the saturation magnetization (us) is at least 110 emu/g or more, preferably 120 emu/g or more, and the coercive force is generally 800 Oe (oersted) or more, preferably 900 Oe or more. The length in the long axis of the powder to be obtained with a transmission electronic microscope is generally 0.5 μm or less, preferably from 0.1 to 0.3 μm; and the (axial) aspect ratio (length in the long axis/length in the short axis) is 12 or less, preferably from 5 to 10.

In order to further improve the characteristics of the magnetic recording medium of the present invention, the magnetic layer composition may optionally contain non-metals of B, C, Al, Si and/or P. In general, the surfaces of the particles of the preceding metal powder are coated with an oxide layer so as to chemically stabilize the powder.

Any known gradual oxidation methods are employable for forming the oxide layer, including, for example, a method of dipping the particles in an organic solvent followed by drying them, a method of dipping the particles in an organic solvent followed by introducing an oxygen-containing gas thereinto to form an oxide film over the surfaces of the particles and then drying them, and a method of forming an oxide film over the surfaces of the particles in a mixed gas comprising an oxygen gas and an inert gas in the absence of an organic solvent by adjusting the partial pressures of the oxygen gas and the inert gas, An example of the ferromagnetic hexagonal ferrite powder for use in the present invention is a tabular one having an axis of easy magnetization in the direction vertical to the plane surface. Such includes, for example, barium ferrite, strontium ferrite, lead ferrite, calcium ferrite and cobalt-substitution product of them. Of them, especially preferred are cobalt-substitution product of barium ferrite and cobalt-substitution product of strontium ferrite. If desired, element(s) of In, Zn, Ge, Nb and/or V may be added thereto so as to further improve the characteristics. In order to elevate the recording density of the magnetic recording medium of the present invention, the particle size of the hexagonal ferrite powder is needed to be small, as mentioned above. In addition, regarding the magnetic characteristics of the powder, the saturation magnetization (us) is at least 50 emu/g or more, preferably 53 emu/g or more, and the coercive force is generally 500 Oe or more, preferably 600 Oe or more. The hexagonal ferrite powder is characterized in that it has a low output in the case of long wavelength recording, as compared with other magnetic particles, but it is expected to have a higher output than other magnetic particles in the case of short wavelength recording to be effected in a high frequency region with a recording wavelength of generally 1.5 μm or less, preferably 1.0 μm or less.

Where the magnetic recording medium of the present invention is in the form of a disc, it is desired that the output of the disc medium is uniform and does not fluctuate in the peripheral direction. For this, it is necessary that the in-plane (longitudinal) orientation ratio is as high as possible. The orientation ratio of the ferromagnetic powder is therefore preferably 0.85 or more, especially preferably is 0.9 or more.

Where a hexagonal ferrite powder is used as the magnetic powder of constituting the magnetic recording medium of the present invention, a high orientation ratio of preferably 0.9 or more (more preferably from 0.9 to 1.0) is realized for the medium.

The orientation ratio as referred to herein indicates a value to be obtained by dividing the minimum squareness ratio in the peripheral direction by the maximum squareness ratio in the same.

In order to realize the orientation ratio to be 0.85 or more, a random-orientation method of applying a permanent magnet to the magnetic layer while the layer is still not dried, as described in JP-B-3-41895 (the term "JP-B" as used herein means an "examined Japanese patent publication") or a method of applying an alternating current magnetic field to the non-dried magnetic layer, as described in JP-A-63-148417, JP-A-1-300427 and JP-A-2-300428 can be employed.

The electromagnetic characteristics, such as the amount of saturation magnetization and the coercive force of the ferromagnetic powder as well as the orientation ratio of the same, are measured by the use of a vibration sample magnetoflux meter (manufactured by Toei Industrial Co.) under the condition of a maximum magnetic field of 5 kOe. Measurement of the specific surface area is effected by the BET method using Quantersorb (manufactured by Quantarchrom Co., USA), in which the sample to be tested is dewatered in a nitrogen atmosphere at 250° C. for 30 minutes and is measured by the BET-one point method (under partial pressure of 0.30).

The ferromagnetic powder is desired to have a water content of from 0.01 to 2% by weight. The water content of the powder is preferably optimized in accordance with the kind of the binder resin combined with it. The pH value of the ferromagnetic powder is also preferably optimized in accordance with the kind of the binder resin used. The pH range may be generally from 4 to 12, preferably from 5 to 10.

The ferromagnetic powder may be surface-treated with Al, Si, P or oxides of them. The amount for the surface-treating agent may be generally from 0.1 to 10% to the ferromagnetic powder to be treated therewith. By the surface treatment, adsorption of a lubricant such as fatty acids to the powder is preferably 100 mg/m$^2$ or less. The ferromagnetic powder often contains a soluble inorganic ion of Na, Ca, Fe, Ni or Sr, and the ions have no influence on the characteristics of the powder provided that the content of them is 500 ppm or less.

If desired, an iron oxide ferromagnetic powder may be used as the ferromagnetic powder in the magnetic layer of the magnetic recording medium of the present invention. The powder is one having a specific surface area by the BET method of generally from 25 to 80 m$^2$/g, preferably from 35 to 60 m$^2$/g. If it is less than 25 m$^2$/g, the noise of the medium would be too high. If it is more than 80 m$^2$/g, the surface smoothness of the magnetic recording medium would be-unfavorably poor. The crystallite size of the powder is generally from 450 to 100 Å, preferably from 350 to 100 Å. The $\sigma s$ of it is generally 50 emu/g or more, preferably 70 emu/g or more.

The non-magnetic layer of the magnetic recording medium of the present invention comprises a non-magnetic powder and a binder resin. The non-magnetic powder to be in the non-magnetic layer includes an inorganic powder and an organic powder. It is preferred to contain at least an inorganic powder along with carbon black as an organic powder.

The non-magnetic powder may previously be treated with a dispersing agent, a lubricant, a surfactant and/or an antistatic agent, which will be mentioned hereinafter, prior to dispersion. The pre-treatment is concretely described in, for example, JP-B-44-14090 (the term "JP-B" as used herein means an "examined Japanese patent publication").

The carbon black in the non-magnetic layer is effective in imparting electroconductivity to the magnetic recording medium of the present invention and preventing static charging of the same. In addition, it is also effective as a material for adjusting the relation of the Young's Moduli between the magnetic layer and the non-magnetic layer. Further, it also has a function of adjusting the thixotropic characteristic of the non-magnetic layer coating solution. Moreover, it is also an extremely effective material of having other various functions for adjustment of the friction factor of the layer and for imparting light-shieldability to the layer. Therefore, it is preferred to incorporate such a carbon black also in the magnetic layer because of the same reasons as above.

The content of the carbon black in the non-magnetic layer is preferably from 0.1 to 30% by weight, especially preferably from 3 to 20% by weight, of the total weight of the non-magnetic powder in the non-magnetic layer. The particle size of the carbon black is from 5 o 800 mμ.

The content of the carbon black in the magnetic layer is preferably from 0.1 to 30% by weight, especially preferably from 1 to 20% by weight, of the total weight of the ferromagnetic powder in the magnetic layer. The particle size of the carbon black is from 5 to 800 mμ.

It is most preferable that the magnetic recording medium of the present invention is produced by first coating a non-magnetic layer coating solution on a non-magnetic support to form a non-magnetic layer thereon followed by overcoating a magnetic layer coating solution thereover while the previously coated non-magnetic layer is still wet. According to the process, an extremely thin magnetic layer having a uniform thickness may be obtained, without the problem of adhesiveness of the layer which is often a difficulty in coating a thin magnetic layer. The coating process is called a wet-on-wet system (as described in JP-A-62-212933 and U.S. Pat. No. 4,844,946), by which peeling of the coated magnetic layer having a thickness of 0.6 μm or less may be prevented with dropout of the medium in the actual use thereof hardly occurring. Thus, a magnetic recording medium or disc having excellent running durability may be obtained. On the contrary, if the magnetic layer is coated after drying of the previously coated non-magnetic layer, adhesion between the non-magnetic layer and the magnetic layer would probably not be sufficient because of the extremely small thickness of the magnetic layer so that an integrated structure of the two layers as formed on the non-magnetic support could not be attained.

The matter to be taken into consideration in the wet-on-wet system is the problem of the thixotropic characteristic of the coating solution. Precisely, if the difference in the thixotropic characteristic between the coating solutions of the upper layer and the lower layer is too large, the interface between the coated upper layer and lower layer would unfavorably have a mixture of the coating solutions to cause a problem of lowering the surface property of the magnetic layer in the case of the present invention where the thickness of the upper magnetic layer is extremely thin.

In order to make the thixotropic characteristics of the two coating solutions as similar to each other as possible, it is effective to use the same dispersion particles in both the upper layer (i.e., the magnetic layer) and the lower layer (i.e., the non-magnetic layer). However, such could not be effected in the case of the present invention. Therefore, in the present invention, it is desired to incorporate particles which may easily form structural viscosity, such as carbon black particles, into the lower non-magnetic layer as the non-magnetic particles therein, in order that the structural viscosity to be formed by the non-magnetic particles in the lower non-magnetic layer may well be compatible with the structural viscosity to be formed by the magnetic property of the ferromagnetic powder in the upper magnetic layer. For this, in the present invention, use of carbon black having a large amount of oil absorption and a small particle size as the non-magnetic powder is effective. In addition, any other non-magnetic inorganic powder than carbon black, having a small particle size, is also effectively used in the present invention. For instance, particles of titanium oxide or aluminium oxide having a particle size of 1 $\mu$m or less are preferred, as easily giving a coating solution having suitable structural viscosity due to suitable coagulation of the particles.

Examples of the non-magnetic inorganic powder to be in the non-magnetic layer of the present-invention include metals, metal oxides, metal carbonates, metal sulfates, metal nitrides, metal carbides and metal sulfides. Specifically mentioned are $TiO_2$ (rutile, anatase), TiOx, cerium oxide, tin oxide, tungsten oxide, ZnO, $ZrO_2$, $SiO_2$, $Cr_2O_3$, $\alpha$-alumina with an alpha-conversion of 90% or more, $\beta$-alumina, $\gamma$-alumina, $\alpha$-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $CaSO_4$, $BaSO_4$ and silicon carbide. They are selected and used, singly or in combination of two or more of them. The size of the inorganic powder is not specifically defined, and the shape thereof may be any of an acicular shape, spherical shape or cubic shape. If desired, different inorganic powders may be combined for use in the present invention. Where a single non-magnetic powder is used, the particle size distribution may suitably be selected. The particle size of the powder may fall within the range of from 0.01 to 2 $\mu$m. As the inorganic powders mentioned above, those mentioned below are preferred.

Such are those preferably having a tap density (measured under the condition of number of tapping: 150 and head: 30 mm using Tap density measuring instrument manufactured by Seishin Enterprise Inc.) of from 0.3 to 2 g/ml; a water content of generally from 0.1 to 5%; a pH value of generally from 2 to 11; a specific surface area of from 1 to 30 $m^2/g$; and an amount of DBP oil absorption of generally from 5 to 100 ml/100 g, preferably from 10 to 80 ml/100 g, more preferably from 20 to 60 ml/100 g. The above-mentioned inorganic powders need not always be 100% pure. The surfaces of them may be treated with any other compounds such as compounds of Al, Si, Ti, Zr, Sn, Sb and/or Zn to form oxides of them on the surfaces thereof, in accordance with the object. In this case, the purity of the powders may well be 70% or more so as not to reduce the effect of them. The ignition loss of the powders is desired to be 20% or less.

Specific examples of the inorganic powder to be used in the present invention include AKP-20, AKP-30, AKP-50 (manufactured by Sumitomo Chemical Co., Ltd.); G5, G7, S-1 (manufactured by Nippon Chemical Industrial Co., Ltd.); and TF-100, TF-120, TF-140 (manufactured by Toda Kogyo Co., Ltd.).

As the carbon black to be in the lower non-magnetic layer of the present invention, usable are furnace black for rubber, thermal black for rubber, carbon black for coloration and acetylene black. They desirably have a specific surface area of from 5 to 500 $m^2/g$, an amount of DPB oil absorption of from 10 to 400 ml/100 g, a particle size of from 5 m$\mu$ to 300 m$\mu$, a pH value of from 2 to 10, a water content of from 0.1 to 10%, and a tap density of from 0.1 to 1 g/ml.

Specific examples include BLACKPEARLES 2000, 1300, 1000, 900, 800, 880, 700 and VULCAN XC-72 (manufactured by Cabot Co., Ltd.); #3050, #3150, #3250, #3750, #3950, #2400B, #2300, #1000, #970, #950, #900, #850, #650, #40, MA40 and MA-600 (manufactured by Mitsubishi Chemical Corporation); CONDUCTEX SC (manufactured by Columbia Carbon Co., Ltd.); 8800, 8000, 7000, 5750, 5250, 3500, 2100, 2000, 1800, 1500, 1255 and 1250 (manufactured by RAVEN Co., Ltd.); and Ketjen Black EC (manufactured by Akzo Co., Ltd.)

The carbon black may be surface-treated with a dispersing agent or may be grafted with a resin to partially graphitize the surface of it. The thus surface-treated carbon black may also be used in the present invention. If desired, the carbon black may previously be dispersed in a binder prior to addition of it to the non-magnetic coating solution for the lower layer. The above-mentioned carbon blacks may be used singly or as a mixture of two or more of them.

The carbon black acts to prevent static charges, improve the film strength, reduce the friction factor and impart a light-shielding property, as mentioned above. These actions vary depending upon the kind of the carbon black to be used. Therefore, the carbon black to be in the magnetic recording medium of the present invention may vary in the lower layer and the upper layer, with respect to the kind, amount and combination so as to attain the above-mentioned various characteristics of the particle size, the amount of oil absorption, the electroconductivity and the pH value in accordance with the object. For instance, a carbon black having a high electroconductivity is incorporated into the lower layer so as to effectively prevent static charging, while a carbon black having a large particle size is incorporated into the upper layer so as to effectively lower the friction factor.

As specific examples of the carbon black for use in the present invention, for example, Handbook of Carbon Black (published by Carbon Black Association) may be referred to.

Suitable examples of the non-magnetic organic powder which can be used in the present invention include an acryl-styrene resin powder, a benzoguanamine resin powder, a melamine resin powder, and a phthalocyanine pigment powder. Also usable are a polyolefin resin powder, a polyester resin powder, a polyamide resin powder, a polyimide resin powder and a polyethylene fluoride resin powder. For producing them, the methods described in JP-A-62-18564 and JP-A-60-255827 are referred to.

The binder in the magnetic layer and the non-magnetic layer of the present invention may be any known thermoplastic resin, thermosetting resin or reactive resin or a mixture of them. The thermoplastic resin for use in the present invention is one having a glass transition temperature of generally from −100° to 150° C, a number average molecular weight of generally from 1,000 to 200,000, preferably from 10,000 to 100,000, and a polymerization degree of approximately from 50 to 1000.

Examples include polymers or copolymers comprising constitutive units of vinyl chloride, vinyl acetate, vinyl alcohols, maleic acid, acrylic acid, acrylates, vinylidene chloride, acrylonitrile, methacrylic acid, methacrylates, styrene, butadiene, ethylene, vinyl butyrals, vinyl acetals and/or vinyl ethers, as well as polyurethane resins and various rubber resins.

Examples of thermosetting resins and reactive resins for use in the present invention include phenolic resins, epoxy resins, hardening polyurethane resins, urea resins, melamine resins, alkyd resins, acrylic reactive resins, formaldehyde resins, silicone resins, epoxy-polyamide resins, mixture of polyester resins and isocyanate prepolymer, mixtures of polyester polyols and polyisocyanates, and mixtures of polyurethanes-and polyisocyanates.

These resins are mentioned in detail in Plastic Handbook (published by Asakura Shoten). Known electronic beam-hardening resins may be incorporated into the lower layer or upper layer of the magnetic recording medium of the present invention. Examples of them and manufacture of them are described in detail in JP-A-62-256219. The above-mentioned resins may be used singly or as a combination of them in the present invention. Of them, a combination of at least one selected from the group consisting of vinyl chloride resins, vinyl chloride-vinyl acetate resins, vinyl chloride-vinyl acetate-vinyl alcohol resins and vinyl chloride-vinyl acetate-maleic anhydride copolymers, and a polyurethane resin, and combination of them and a polyisocyanate are preferred.

Polyurethane resins for use in the present invention include known polyester polyurethanes, polyether polyurethanes, polyether polyester polyurethanes, polycarbonate polyurethanes, polyester polycarbonate poly-urethanes and polycaprolactone polyurethanes. In order to attain further better dispersibility and durability, preferred is the introduction of at least one or more polar groups selected from COOM, SO$_3$M, OSO$_3$M, P=O(OM)$_2$, O−P=O(OM)$_2$ (where M is a hydrogen atom or an alkali metal), OH, NR$_2$, N+R$_3$ (where R is a hydrocarbon-residue), an epoxy group, SH and CN into the binders as hereinabove exemplified, by copolymerization or addition reaction. The amount of such polar groups in the binder, if any, is generally from $1 \times 10^{-1}$ to $1 \times 10^{-8}$ mol/g, preferably from $1 \times 10^{-2}$ to $1 \times 10^{-6}$ mol/g.

Specific examples of the binders for use in the present invention include VAGH, VYHH, VMCH, VAGF, VAGD, VROH, VYES, VYNC, VMCC, XYHL, XYSG, PKHH, PKHJ, PKHC, PKFE (manufactured by Union Carbide Co., Ltd.); MPR-TA, MPR-TA5, MPR-TAL, MPR-TSN, MPR-TMF, MPR-TS, MPR-TM, MPR-TAO (manufactured by Nisshin Chemical Industry Co., Ltd.); 1000W, DX80, DX81, DX82, DX83, 100FD (manufactured by Electro Chemical Industry Co., Ltd.); MR105, MR110, MR100, 400X100A (manufactured by Nippon Zeon Co., Ltd.); NIPPOLLAN N2301, N2302, N2304 (manufactured by Nippon Polyurethane Co., Ltd.); PANDEX T-5105, T-R3080, T-5201, VURNOCK D-400, D-210-80, CKISVON 6109, 7209 (manufactured by Dai-Nippon Ink and Chemicals, Inc.); VYLON UR8200, UR8300, UR8600, UR5500, UR4300, RV530, RV280 (manufactured by Toyobo Co., Ltd.); DAIPHERAMINE 4020, 5020, 5100, 5300, 9020, 9022, 7020 (manufactured by Dainichi Seika Co., Ltd.); MX5004 (manufactured by Mitsubishi Chemical Corporation; SUNPRENE SP-150 (manufactured by Sanyo Chemical Industries Co., Ltd.); and SALAN F310, F210 (manufactured by Asahi Chemical Industry, Ltd.)

The proportion of the binder in the upper magnetic layer of the magnetic recording medium of the present invention is from 5 to 50% by weight, preferably from 10 to 30% by weight, to the ferromagnetic powder therein. Where vinyl chloride resins are used, the proportion is from 5 to 30% by weight; where polyurethane resins are used, it is from 2 to 20% by weight; and where polyisocyanates are used, it is from 2 to 20% by weight. Combinations of them are preferably used.

The proportion of the binder in the lower non-magnetic layer of the magnetic recording medium of the present invention is from 5 to 50% by weight, preferably from 10 to 30% by weight, to the non-magnetic powder therein. Where vinyl chloride resins are used, the proportion is from 5 to 30% by weight; where polyurethane resins are used, it is from 2 to 20% by weight; and where polyisocyanates are used, it is from 2 to 20% by weight. Combinations of them are preferably used.

Where polyurethane resins are used in the present invention, they preferably have a glass transition temperature of from −50 to 100° C., a breaking point elongation of from 100 to 2000%, a breaking point stress of from 0.05 to 10 kg/cm$^2$, and an yield value of from 0.05 to 10 kg/cm$^2$.

In the present invention, in order to make the Young's Modulus of the upper layer lower than that of the lower layer, for example, the same polyurethane resin is used in both the upper layer and the lower layer while the amount of the resin in the upper layer is made larger than that in the lower layer; or the amount of the binder resin, the amount of the vinyl chloride resin, polyurethane resin, polyisocyanate or other resins in the binder resin, the molecular weight of each resin as well as the amount of the polar groups in the same of constituting the magnetic layer and other various physical characteristics mentioned above of the resins of constituting the layers are varied in the upper layer and the lower layer.

The magnetic recording medium of the present invention basically comprises two layers of the non-magnetic layer and the magnetic layer but may comprise three or more layers. When the medium comprises three or more layers, the upper magnetic layer is composed of two or more plural magnetic layers. In this case, general knowledge of plural magnetic layers may apply to the relationship between the uppermost layer and the other lower magnetic layers. For instance, the uppermost magnetic layer has a higher coercive force than the other lower magnetic layers, and the former contains a ferromagnetic powder having a smaller mean length in the long axis and a smaller crystallite size than the latter. As the case may be, the lower non-magnetic layer of the medium of the present invention may be composed of plural non-magnetic layers. In principle, the medium has a two-layer constitution composed of the upper magnetic layer unit and the lower non-magnetic layer unit.

As polyisocyanates for use in the present invention, mentioned are, for example, isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate and triphenylmethane triisocyanate; products of these isocyanates and polyalcohols; and polyisocyanates to be formed by condensation of these iso-cyanates. As commercial products of these isocyanates, there are CORONATE L, CORONATE HL, CORONATE 2030, CORONATE 2031 MILLIONATE MR, MILLIONATE MTL (manufactured by Nippon Polyurethane Co., Ltd.); TAKENATE D-102, TAKENATE D-110N, TAKENATE D-200, TAKENATE D-202 (manufactured by Takeda Chemicals Industries Co., Ltd.); and DESMODUR L, DESMODUR IL, DESMODUR N, DESMODUR EL (manufactured by Sumitomo Bayer Co, Ltd.). These may be incorporated into the lower non-magnetic layer and the upper magnetic layer, singly or as a combination of two or more of them on the basis of the difference in the hardening reactivity between them.

The carbon black in the upper (magnetic) layer of the medium of the present invention may be any of furnace black for rubbers, thermal black for rubbers, carbon black for coloration and acetylene black. It is preferred that the carbon black has a specific surface area of from 5 to 500 $m^2/g$, a DBP oil absorption amount of from 10 to 400 ml/100 g, a particle size of from 5 m$\mu$ to 300 m$\mu$, a pH value of from 2 to 10, a water content of from 0.1 to 10% and a tap density of from 0.1 to 1 g/ml. Specific examples of the carbon black include BLACKPEARLS 2000, 1300, 1000, 900, 800, 700, VULCAN XC-72 (manufactured by Cabot Co., Ltd.); #80, #60, #55, #50, #35 (manufactured by Asahi Carbon Co., Ltd.); #2400B, #2300, #900, #1000, #30, #40, #10B (manufactured by Mitsubishi Chemical Corporation); and CONDUCTEX SC, RAVEN 150, 50, 40, 15 (manufactured by Columbia Carbon Co., Ltd.). The carbon black for use in the present invention may be surface-treated with a dispersing agent, or may be grafted with a resin, or the surface thereof may be partly graphitized. The carbon black may previously be dispersed in a binder prior to addition thereof to the magnetic coating solution. These carbon blacks may be used singly or in combination of two or more of them. For the carbon blacks to be in the upper layer of the medium of the present invention, for example, the disclosure of Carbon Black Handbook (published by Carbon Black Association) may be referred to.

The upper magnetic layer or the lower non-magnetic layer of the medium of the present invention may contain an abrasive. Such abrasives include various known materials having a Mohs' hardness of 6 or more, singly or in combination of them. They include, for example, $\alpha$-alumina having an alpha-conversion of 90% or more, $\beta$-alumina, silicon carbide, chromium oxide, cerium oxide, $\alpha$-iron oxide, corundum, synthetic diamond, silicon nitride, silicon carbide, titanium carbide, titanium oxide, silicon dioxide, and boron nitride. A composite of these abrasives (as prepared by surface-treating one abrasive with another abrasive) may also be used. The abrasives often contain other compounds or elements than the essential component, which may also be used in the present invention to attain the same effect, provided that the content of the essential component therein is 90% or more.

The abrasives are desired to have a particle size of from 0.01 to 2 $\mu$m. If desired, combinations of plural abrasives each having a different particle size may be employed in the present invention. A single abrasive having a broad particle size distribution may also be used to attain the same effect. The abrasives preferably have a tap density of from 0.3 to 2 g/ml, a water content of from 0.1 to 5%, a pH value of from 2 to 11, and a specific surface area of from 1 to 30 $m^2/g$. The shape of the abrasives for use in the present invention may be any of acicular shape, spherical shape or cubic shape. Preferred are those having angular corners as the shape thereof, as such have high abrasiveness.

Specific examples of the abrasive for use in the present invention include AKP-20, AKP-30, AKP-50, HIT-50 (manufactured by Sumitomo Chemical Co., Ltd.); G5, G7, S-1 (manufactured by Nippon Chemical Industrial Co., Ltd.); and TF-100, TF-140, 100ED, 140ED (manufactured by Toda Kogyo Co., Ltd.). It is of course possible to differently incorporate various abrasives of different kinds and different amounts in different combinations into the lower layer and the upper layer of constituting the medium of the present invention, in accordance with the object.

For instance, in order to elevate the durability of the surface of the magnetic layer, the amount of the abrasive in the upper magnetic-layer may be increased large. In order to elevate the durability of the edges of the magnetic layer, the amount of the abrasive in the lower non-magnetic layer may be increased. The abrasive may previously be dispersed in a binder resin prior to addition of it into the magnetic coating solution. The amount of the abrasive particles in the surface of the magnetic layer and the edges of it of the recording medium of the present invention is preferably 5 particles/100 $\mu m^2$ or more.

Various additives such as those having a lubricating effect, antistatic effect, dispersing effect or plasticizing effect may be added to the magnetic recording medium of the present invention.

Such additives, usable in the present invention are, for example, molybdenum disulfide, tungsten disulfide, graphite, boron nitride, graphite fluoride, silicone oil, polar group-containing silicones, fatty acid-modified silicones, fluorine-containing silicones, fluorine-containing alcohols, fluorine-containing esters, polyolefins, polyglycols, alkylphosphates and their alkali metal salts, alkylsulfates and their alkali metal salts, polyphenyl ethers, fluorine-containing alkylsulfates and their alkali metal salts, monobasic fatty acids having from 10 to 24 carbon atoms (optionally unsaturated or branched) and their metal salts (with Li, Na, K, Cu), mono-, di-, tri-, tetra-, hepta- or hexa-alcohols having from 12 to 22 carbon atoms (optionally unsaturated or branched), alkoxyalcohols having from 12 to 22 carbon atoms, fatty acid monoesters, fatty acid diesters or fatty acid triesters composed of monobasic fatty acids having from 10 to 24 carbon atoms (optionally unsaturated or branched) and anyone of mono-, di-, tri-, tetra-, hepta- or hexa-alcohols having from 2 to 12 carbon atoms (optionally unsaturated or branched), fatty acid esters of monoalkyl ethers of alkylene oxide polymers, fatty acid amides having from 8 to 22 carbon atoms, and aliphatic amines having from 8 to 22 carbon atoms.

Specific examples include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

In addition, nonionic surfactants such as alkylene oxides, glycerins, glycidols and alkylphenol-ethyleneoxide adducts; cationic surfactants such as cyclic amines, ester amides, quaternary ammonium salts, hydantoin derivatives, heterocyclic compounds, phosphoniums and sulfoniums; anionic surfactants containing acid groups such as carboxylic acid group, sulfonic acid group, phosphoric acid group, sulfate ester group and phosphate ester group; and amphoteric surfactants such as amino acids, amino sulfonic acids, sulfuric acid or phosphoric acid esters of aminoalcohols and alkylbetains are also usable in the present invention. These surfactants are described in detail in Surfactant Handbook (published by Sangyo Tosho KK).

The lubricant and antistatic agent for use in the present invention do not always need to be 100% pure. As the case may be, they may contain various impurities, in addition to the essential component, such as isomers, nonreacted materials, side products, decomposates and oxides. The content of the impurities in the agent is desired to be preferably 30% or less, more preferably 10% or less.

The lubricant and surfactant may differently be incorporated into the lower non-magnetic layer and the upper magnetic layer constituting the medium of the present invention, with respect to the kind and amount of them, in accordance with necessity. For instance, they may be incorporated into the necessary layers in such a way that different fatty acids each having a different melting point are incorporated differently in the lower non-magnetic layer and the upper magnetic layer,-so as to prevent bleeding of the coated layers; that different esters each having a different boiling point or having different polarity are incorporated therein also so as to prevent bleeding of the coated layers; that the amount of the surfactant to be in the coating solutions is controlled to elevate the coating stability; and that the amount of the lubricant is increased in the lower non-magnetic layer so as to elevate the lubricating effect. Needless to say, the illustrated embodiments are not limitative.

All or a part of the additives in the layers constituting the magnetic recording medium of the present invention may be added to the coating solution at any step of preparing the solution. For instance, they may be blended with a ferromagnetic powder prior to kneading; they may be added to a mixture of a ferromagnetic powder, a binder and a solvent during the step of kneading them; they may be added during dispersion or after dispersion; or they may be added immediately before coating.

Examples of commercial lubricant products for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acids, NAA-42, NAA-44, CATION SA, CATION MA, CATION AB, CATION BB, NYMEEN L-201, NYMEEN L-202, NYMEEN L-202, NYMEEN S-202, NONION E-208, NONION P208, NONION S-207, NONION K-204, NONION NS-202, NONION NS-210, NONION HS-206, NONION L-2, NONION S-2, NONION S-4, NONION 0-2, NONION LP-20R, NONION PP-40R, NONION SP-60R, NONION OP-80R, NONION OP-85R, NONION LT-221, NONION ST-221, NONION OT-221, MONOGURI MG, NONION DS-60,- ANON BF, ANON LG, butyl stearate, butyl laurate, erucic acid (manufactured by Nippon Oils & Fats Co., Ltd.); oleic acid (manufactured by Kanto Chemical Co., Ltd.); FAL-205, FAL123 (manufactured by Takemoto Yushi Co., Ltd.); Enujerubu LO, Enujerubu IPM, Sansosyzer E4030 (manufactured by ShinNihon Rika Co., Ltd.); TA-3, KF-96, KF-96L, KF-96H, KF410, KF420, KF965, KF54, KF50, KF56, KF-907, KF-851, X-22-818, X-22-822, KF-905, KF-700, KF-393, KF-857, KF-860, KF-865, X-22-980, KF-101, KF-102, KF-103, X-22-3710, X-22-3715, KF-910, KF-3935 (manufactured by Shin-Etsu Chemical Co., Ltd.); ARMIDE P, ARMIDE C, ARMOSLIP CP (manufactured by Lion Ahmer Co., Ltd.); DUOMIN TDO (manufactured by Lion Oils & Fats Co., Ltd.); BA-41G (manufactured by Nisshin Oil Mills Co., Ltd.); and PROFAN 2012E, NEWPOLE PE61, IONET MS-400, IONET MO-200, IONET DL-200, IONET DS-300, IONET DS-1000, IONET DO-200 (manufactured by Sanyo Chemical Co., Ltd.)

The coating solution for the layers of the magnetic recording medium of the present invention can contain organic solvents in any desired proportion. Such organic solvents include, for example, ketones such as acetone, methyl ethyl ketone, methyl isobutyl ketone, diisobutyl ketone, cyclohexanone, isophorone, tetrahydrofuran; alcohols such as methanol, ethanol, propanol, butanol, isobutyl alcohol, isopropyl alcohol, methylcyclohexanol; esters such as methyl acetate, butyl acetate, isobutyl acetate, isopropyl acetate, ethyl lactate, glycol acetate; glycol ethers such as glycol dimethylether, glycol monoethylether, dioxane; aromatic hydrocarbons such as benzene, toluene, xylene, cresol, chlorobenzene; chlorinated hydrocarbons such as methylene chloride, ethylene chloride, carbon tetrachloride, chloroform, ethylene chlorohydrin, dichlorobenzene; and N,N-dimethylformamide and hexane. These organic solvents need not be 100% pure, but may contain various impurities, in addition to the main component, such as isomers, non-reacted materials, side products, decomposates, oxides and water. The content of the impurities therein is desired to be preferably 30% by weight or less, more preferably 10% by weight or less.

The kind and amount of the organic solvents to be used in The upper layer and the lower layer constituting the medium of the present invention may be varied.

Examples of ways of incorporating the organic solvents to the layers include such that a more volatile solvent is in the upper layer so as to elevate the surface property; a solvent having a higher surface tension (e.g., cyclohexanone, dioxane) is used in the lower layer so as to elevate the coating stability; and a solvent having a higher dissolution parameter is used in the lower layer so as to elevate the filling density. Needless to say, however, the illustrated examples are not limitative.

Examples of the non-magnetic support of the medium of the present invention are any known films of polyesters such as polyethylene terephthalate or polyethylene naphthalate, as well as polyolefins, cellulose triacetate, polycarbonates, polyamides, polyimides, polyamidoimides, polysulfones, aramides or aromatic polyamides. The support may previously be subjected to corona discharging treatment, plasma treatment, easy adhesion treatment, heat treatment, dust removing treatment, etc.

The non-magnetic support has preferably a thickness of from 1 to 100 μm.

In order to attain the objectives of the present invention, the non-magnetic support is desired to be one having a center line mean surface roughness (Ra) (cut-off value: 0.25 mm) of generally 0.03 μm or less, preferably 0.02 μm or less, more preferably 0.01 μm or less. In addition, it is desired that the support not only has such a small center line mean surface roughness but also does not have large protrusion of 1 μm or more. The roughness profile of the surface of the support may freely be controlled in accordance with the size and the amount of the filler to be added to the support, if desired. Examples of the fillers include oxides and carbonates of Ca, Si and Ti, as well as organic fine powders of acrylic substances.

The F-5 (i.e., the load at the 5% elongation) value of the non-magnetic support in the web-running direction (lengthwise direction) is preferably from 5 to 50 kg/mm$^2$, and that in the web-width direction is preferably from 3 to 30 kg/mm$^2$. In general, the F-5 value in the web lengthwise direction is higher than that in the tape width direction. However, when the strength of the support in the widthwise direction is desired to be high, the definition shall not apply.

A undercoating layer may be provided between the non-magnetic support and the lower layer so as to elevate the adhesion between them. The thickness of the undercoating layer is generally from 0.01 to 2 μm, preferably from 0.05 to 0.5 μm. A back coating layer may also be provided on the side of the non-magnetic support opposite to the side of the magnetic layer. The thickness of the back coating layer is generally from 0.1 to 2 μm, preferably from 0.3 to 1.0 μm. The undercoating layer and the back coating layer may be conventional ones.

The thermal shrinkage of the non-magnetic support in both the web-running direction and the web-width direction at 100° C. for 30 minutes is preferably 3% or less, more preferably 1.5% or less; and the same at 80° C. for 30 minutes is preferably 1% or less, more preferably 0.5% or less. The strength of the support at the breaking point is preferably from 5 to 100 kg/mm$^2$ in the both directions.

The process of producing the magnetic coating composition for the magnetic recording medium of the present invention comprises at least a kneading step, a dispersing step and optionally a mixing step to be provided before and after the preceding steps. The respective steps each may be composed of two or more stages. In producing the composition, all the raw materials of the ferromagnetic powder, binder, carbon black, abrasive, antistatic agent, lubricant and solvent may be added to the reactor initially at the start of the process or later during the course of the process. The individual raw materials may divided into a plurality of preparations to be added in two or more steps of the process. For instance, polyurethane is divided into plural preparations and added in the kneading step and dispersing step and also in the mixing step for adjustment of the viscosity after dispersion.

For attaining the object of the present invention, any known conventional technology may of course be employed as a part of the process of producing the magnetic recording medium of the invention. For instance, in the kneading step, a kneading machine having a strong kneading power, such as a continuous kneader or a pressure kneader, may be employed so as to obtain the magnetic recording medium with high Br of the present invention. Where such a continuous kneader or a pressure kneader is employed, a ferromagnetic powder is kneaded with all or a part (preferably 30% by weight or more) of a binder. For instance, 100 parts by weight of a ferromagnetic powder is blended with from 15 to 500 parts by weight of a binder. The details of the kneading technology are described in JP-A-1-106338 and JP-A-64-79274. For preparing the lower non-magnetic layer coating solution, dispersing media with a high specific gravity are preferably used. Suitable are zirconia beads and metal beads.

For more efficiently producing the magnetic recording medium of the present invention, a simultaneous multiple layered-coating system such as that described in JP-A-62-212933 is employed preferably. Examples of the apparatus and process for producing the magnetic recording medium of the present invention, which is composed of plural layers coated on a support are as follows.

1. A lower layer is first coated on a support with a gravure coating, roll coating, blade coating or extrusion coating device, which is generally employed for coating a magnetic coating solution, and while the coated lower layer is still wet, an upper layer is coated thereover with a support-pressing extrusion coating device as illustrated in JP-B-1-46186 and JP-A-60-238179 and JP-A-2-265672.

2. A lower layer and an upper layer are almost simultaneously coated on a support with one coating head having therewith two coating solution passing slits, as illustrated in JP-A-63-88080, JP-A-2-17921 and JP-A-2-265672.

3. A lower layer and an upper layer are almost simultaneously coated on a support with a back-up roll-equipped extrusion coating device as illustrated in JP-A-2-174965.

In order to prevent a reduction in the electromagnetic characteristics of the magnetic recording medium due to aggregation of the ferromagnetic powder coated, it is desirable to apply a shearing force to the coating solution in the inside of the coating head by the method described in JP-A-62-95174 and JP-A-1-236968.

As calendering rolls to be used in producing the medium of the present invention, usable are heat-resistant plastic rolls made of epoxy, polyimide, polyamide or polyimidoamide resins. Calendering may also be effected between two metal rolls. The calendering temperature is preferably 70° C. or higher, more preferably 80° C. or higher. The linear pressure for calendering is preferably 200 kg/cm or more, more preferably 300 kg/cm or more.

The surface intrinsic resistance of the magnetic layer of the magnetic recording medium of the present invention is preferably from $1 \times 10^5$ to $5 \times 10^9$ Ω/sq.

The strength of the upper layer at the breaking point is preferably from 1 to 30 kg/cm$^2$; and the thermal shrinkage of the same at every temperature of 100° C. or lower is preferably 1% or less, more preferably 0.5% or less, most preferably 0.1% or less.

The content of the solvent remaining in the upper layer of the medium of the present invention is preferably 100 mg/m$^2$ or less, more preferably 10 mg/m$^2$ or less; and the amount of the remaining solvent in the upper layer is desired to be smaller than that in the lower layer.

The voidage of the upper layer and that of the lower layer each are preferably 30% by volume or less, more preferably 10% by volume or less. The voidage of the lower layer is preferably larger than that of the upper layer. If desired, the voidage of the lower layer may often be lower than that of the upper layer, provided that the former is 5% or more.

The magnetic recording medium of the present invention has the upper layer and the lower layer, and it may easily be presumed that the two layers may differ from each other in their physical properties in accordance with the object.

Using the magnetic recording disc of the present invention, high-density magnetic recording may be effected. In particular, the disc satisfies the overwriting characteristic which is indispensable to a digital data recording medium to be used for storage and reading out of computer information. Advantageously, the overwriting characteristic of the disc of the present invention does not decrease even in high-density recording. For example, with a shortest recording wavelength of 1.5 μm or less the running durability of it also does not decrease even in such recording.

This advantage results from the particular relation between the Young's Moduli of the two layers of constituting the magnetic disc of the present invention and also from the particular method of forming them. In particular, it results from the above-mentioned constitution of the two layers to be formed on the non-magnetic support and the method of forming them thereon.

In addition, the magnetic recording disc of the present invention may well apply to recording not only with a shortened recording wavelength but also for an elevated track density, whereupon cross-talk of signals is little and recording with excellent peak shift separation is possible. Therefore, the disc may still maintain the excellent overwriting characteristic and running durability even while recording with a shortest recording wavelength of 1.5 μm or less under the condition of a recording track pitch of 50 μm or less and a track density of 14 tracks/mm or more. Reproduction of the recorded information from the disc may be effected repeatedly with ease, as the disc has excellent running durability.

The present invention will be explained in more detail by way of the following examples, which, however, are not intended to restrict the scope of the present invention. Unless otherwise specifically indicated, all "parts" in them are "parts by weight".

EXAMPLE 1

A coating solution for the lower non-magnetic layer and a coating solution for the upper magnetic layer were prepared, each having the composition mentioned below.

| Coating Solution for Lower Non-magnetic Layer: | |
|---|---|
| Non-magnetic Inorganic Powder | 80 parts |
| Granular TiO$_2$ (TY50, by Ishihara Sangyo KK) | |
| mean particle size: 0.34 μm | |
| specific surface area by BET method: 5.9 m$^2$/g | |
| pH: 5.9 | |
| Carbon Black | 20 parts |
| mean particle size: 16 mμ | |
| DBP oil absorption amount: 80 ml/100 g | |
| pH: 8.0 | |
| specific surface area by BET method: 250 m$^2$/g | |
| volatile content: 1.5% | |
| Vinyl Chloride-Vinyl Acetate-Vinyl | 16 parts |
| Alcohol Copolymer containing 5 × 10$^{-6}$ eg/g of polar group —N(CH$_3$)$_3$+Cl— | |
| composition ratio: 86/13/1 | |
| polymerization degree: 400 | |
| Polyester Polyurethane Resin | 7 parts |
| neopentyl glycol/caprolactone polyol/MDI = 0.9/2.6/1 | |
| containing 1 × 10$^{-4}$ eq/g of —SO$_3$Na group | |
| Sec-butyl Stearate | 4 parts |
| Butoxyethyl Stearate | 2 parts |
| Oleic Acid | 1 part |
| Methyl Ethyl Ketone | 200 parts |
| Coating Solution for Upper Magnetic Layer: | |
| Fine Ferromagnetic Metal Powder | 100 parts |
| composition: Fe/Ni = 96/4 | |
| Hc: 1620 Oe | |
| specific surface area by BET method: 50 m$^2$/g | |
| crystallite size: 195 Å | |
| particle size (length in the long axis): 0.20 μm | |
| acicular ratio: 10 | |
| saturation magnetization ($\sigma_s$): 130 emu/g | |
| Vinyl Chloride-Vinyl Acetate-Vinyl | 14 parts |
| Alcohol Copolymer containing 1 × 10$^{-4}$ eq/g of —SO$_3$Na group | |
| polymerization degree: 300 | |
| Polyester Polyurethane Resin | 5 parts |
| neopentyl glycol/caprolactone polyol/MDI = 0.9/2.6/1 | |
| containing 1 × 10$^{-4}$ eq/g of —SO$_3$Na group | |
| α-alumina (mean particle size: 0.3 μm) | 2 parts |
| Carbon Black (mean particle size: 0.10 μm) | 0.5 part |
| Isohexadecyl Stearate | 6 parts |
| Oleic Acid | 1 part |
| Methyl Ethyl Ketone | 200 parts |

Each of the preceding two coating solutions of the non-magnetic layer coating solution and the magnetic layer coating solution was kneaded in a continuous kneader and then dispersed with a sand mill. To each dispersion thus obtained was added polyisocyanate (Coronate L, manufactured by Nippon Polyurethane Co., Ltd.), in an amount of 8 parts to the lower layer coating solution and 12 parts to the upper layer coating solution. 40 parts of butyl acetate was added thereto and filtered through a filter having a mean pore diameter of 1 μm. Thus, a lower layer coating solution and an upper layer coating solution were prepared.

The lower layer coating solution and the upper layer coating solution thus prepared were coated on a polyethylene terephthalate support having a thickness of 62 μm and a center line mean surface roughness of 0.01 μm, the support having been coated with an undercoating layer of 0.1 μm, by a simultaneous multiple layered coating method of such a way that the lower layer coating solution was first coated on the support in a dry thickness of 2 μm and immediately after the coating the upper layer coating solution was coated thereover in a dry thickness of 0.5 μm. Then, while the two layers thus coated were still wet, the coated support was passed through two alternating current magnetic field generating devices.

Of the two alternating current magnetic fields, the upper field had a frequency of 50 Hz and a magnetic field strength of 200 Oe and the lower field had 120 Hz and 130 Oe. After drying, the coated support was processed with a 7-stage calendering device (linear pressure 300 kg/cm, temperature 90° C.) and stamped to a size of 3.5 inches. The surface thereof was coated with an abrasive tape. Determined structure parts of a 3.5- inch floppy disc were applied to this to produce a 3.5-inch floppy disc sample No. 1.

EXAMPLE 2

Another 3.5-inch floppy disc sample No. 2 was produced in the same manner as in Example 1, except that the polyester polyurethane resin in the upper and lower layers was replaced by one comprising neopentyl glycol/caprolactone polyol/MDI=1.7/4.1/1 (containing $1\times10^{-4}$ eq/g of —SO$_3$Na group).

COMPARATIVE EXAMPLE 1

A comparative 3.5-inch floppy disc sample No. 3 was produced in the same manner as in Example 1, except that the content of the vinyl chloride-vinyl acetate-vinyl alcohol copolymer in the upper layer coating solution was changed to 19 parts, that the polyester polyurethane resin was replaced by one comprising neopentyl glycol/caprolactone polyol/MDI=1.8/2.6/1 (containing $1\times10^{-4}$ eq/g of —SO$_3$Na group) and that the content of the polyisocyanate in the upper layer coating solution was changed to 5 parts.

COMPARATIVE EXAMPLE 2

A comparative 3.5-inch floppy disc sample No. 4 was produced in the same manner as in Example 1, except that the polyester polyurethane resin in the upper magnetic layer coating composition was replaced by one comprising neopentyl glycol/caprolactone polyol/MDI=1.8/2.6/1 (containing $1\times10^{-4}$ eq/g of —SO$_3$Na group), that the content of the polyisocyanate in the same solution was changed to 12 parts and that the content of the polyisocyanate in the lower layer coating solution was changed to 8 parts.

COMPARATIVE EXAMPLE 3

A comparative 3.5-inch floppy disc sample No. 5 was produced in the same manner as in Example 1, except that the content of the polyisocyanate in the upper layer coating solution was changed to 12 parts, that the content of the vinyl chloride-vinyl acetate-vinyl alcohol copolymer in the lower layer coating solution was changed to 19 parts, that the polyester polyurethane resin was replaced by one comprising neopentyl glycol/caprolactone polyol/MDI=1.8/2.6/1 (containing $1\times10^{-4}$ eq/g of —SO$_3$Na group) and that the content of the polyisocyanate in the lower layer coating solution was changed to 5 parts.

COMPARATIVE EXAMPLE 4

A comparative 3.5-inch floppy disc sample No. 6 was produced in the same manner as in Example 1, except that the thickness of the upper layer was changed to 1.7

COMPARATIVE EXAMPLE 5

A comparative 3.5-inch floppy disc sample No. 7 was produced in the same manner as in Example 1, except for the following points: The upper layer coating solution was coated on a polyethylene terephthalate support having a thickness of 62 μm and a center line mean surface roughness of 0.01 μm and having been coated with an undercoating layer having a thickness of 0.1 μm to form the upper layer having a thickness of 2.7 μm thereon. While wet, the coated support was passed through two alternating current magnetic field generating devices. This was then processed in the same manner as in Example 1 with a 7-stage calendering device and stamped into a size of 3.5 inches, and the surface thereof was varnished with an abrasive tape. Determined structure parts of a 3.5inch floppy disc were applied to this to produce a comparative 3.5-inch floppy disc sample No. 7.

COMPARATIVE EXAMPLE 6

Using the same upper layer coating solution and lower layer coating solution as those in Example 1, a comparative 3.5-inch floppy disc sample No. 8 was produced in the manner mentioned below. The lower layer coating solution was first coated on a polyethylene terephthalate support having a thickness of 62 μm and a center line mean surface roughness of 0.01 μm, the support having been coated with an undercoating layer of 0.1 μm thick, to form the lower layer having a dry thickness of 2 μm thereon. After drying, the coated support was reeled up. Then, the upper layer coating solution was coated over the previously coated lower layer of the unreeled support to form the upper layer having a thickness of 0.5 μm. While wet, the coated support was passed through two alternating current magnetic field generating devices. Of the two alternating current magnetic fields, the upper field had a frequency of 50 Hz and a magnetic field strength of 200 Oe and the lower field was 120 Hz and 130 Oe. After drying, the coated support was processed with a 7-stage calendering device (linear pressure 300 kg/cm, temperature 90° C.) and stamped to a size of 3.5 inches. The surface thereof was coated with an abrasive tape. Determined structure parts of a 3.5-inch floppy disc were applied to this to produce a comparative 3.5-inch floppy disc sample No. 8.

The samples thus produced were tested and evaluated by the methods mentioned below.

Young's Modulus and glass transition temperature:

These were obtained by the methods mentioned above.

Running Durability:

Using a floppy disc drive FD1331 Model (manufactured by Nippon Electric Co.), 240 tracks were recorded each disc sample in all under the condition of a recording frequency of 625 kHz. At the position of 37.25mm of the radius from the center, the recorded sample was subjected to a thermo-cycle test having the thermo-cycle flow (one cycle) of Table 1 below. At most 12,000 thousands cycles were applied to each sample, whereupon the running condition of each sample was observed to evaluate the running durability thereof.

TABLE 1

Thermo-cycle Flow:

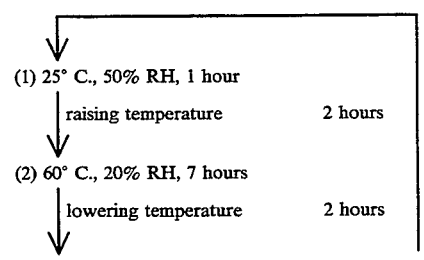

TABLE 1-continued

Thermo-cycle Flow:

(2) 25° C., 50% RH, 1 hour
  | lowering temperature    2 hours
  ↓
(4) 5° C., 50% RH, 7 hours
  | raising temperature    2 hours The cycle of (1) to (4) is repeated.

After every 500 thousands cycles pass, determination of dropout, if any, of each sample and-visual inspection of the outward appearance of the surface of the same with the naked eye were effected, whereupon the test was stopped when the output became 60% of the initial value or when dropout of not less than IBIT of 45% or less of the output occurred.

Overwriting Characteristic:

Using a floppy disc drive FD1331 Model, recording on each sample as previously subjected to alternating current demagnetization was conducted at a track position of 000 with a frequency of 312.5 kHz, and the output 01 (dB) of the 312.5 kHz component was measured with a spectrum analyzer TR4171 Model (manufactured by Advantest Co.). Immediately after the measurement, the sample was overwritten with a frequency of 1 MHz, whereupon the overwriting value 02-01 (dB) was obtained from the output 02 (dB) of the 312.5 kHz component. In general, ordinary digital recording medium are needed to have the value of −30 dB or less.

The results obtained in the tests are shown in Table 2 below, which indicates the characteristics of the samples of the previous examples and comparative examples.

tive Examples 2 and 3 had a high ratio of Young's Moduli of 110.4% and 124.4%, respectively, and therefore they also had poor running durability. Sample No. 6 of Comparative Example 4, though having a satisfactory ratio of Young's Moduli, had poor overwriting characteristic since the magnetic layer thereof was thick at 1.7 µm. Sample No. 7 of Comparative Example 5 had no lower layer but had only a magnetic layer having a thickness of 2.7 µm, and it had poor overwriting characteristic. Sample No. 8 of Comparative Example 6, though satisfying the appropriate range of the ratio of Young's Moduli, had poor running durability since the two layers were coated by the successive (one-after-another) coating system but not by the inventive wet-on-wet coating system.

In accordance with the present invention as explained in detail in the above, a layer constitution of a particular composition comprising a lower non-magnetic layer and an upper magnetic layer where the Young's Modulus of the upper layer has been controlled to be smaller than that of the lower layer by a determined ratio provides a magnetic recording medium, whereby the running durability of the medium has been improved. In addition, the thickness of the magnetic layer of the medium has been defined to be 0.6 µm or less so that the medium is free from the obstruction of peeling of the layer. Thus, the present invention provides a high-capacity magnetic recording medium, especially magnetic recording disc, having excellent overwriting characteristic with high output, by the wet-on-wet coating system of high producibility.

While the invention has been described in detail and with reference to specific embodiments thereof, it will be apparent to one skilled in the art that various changes and modifications can be made therein without departing from the spirit and scope thereof.

What is claimed is:

TABLE 2

|  | Sample No. | Young's Moduli ($\times 10^3$ kg/cm$^2$) | | Ratio of Young's Moduli (100 Eb/Ea) (%) | Glass Transition Point (°C.) | | Running Durability ($\times$ 10,000 cycles pass) | Overwriting Characteristic |
| --- | --- | --- | --- | --- | --- | --- | --- | --- |
|  |  | Upper Layer (Eb) | Lower Layer (Ea) |  | Upper Layer (Tgb) | Lower Layer (Tga) |  |  |
| Example 1 | 1 | 48 | 51 | 94.1 | 65 | 68 | 1200 | −35 |
| Example 2 | 2 | 47 | 51 | 92.2 | 63 | 68 | 1200 | −36 |
| Comparative Example 1 | 3 | 41 | 51 | 80.4 | 73 | 68 | 500 | −35 |
| Comparative Example 2 | 4 | 53 | 48 | 110.4 | 75 | 67 | 300 | −34 |
| Comparative Example 3 | 5 | 51 | 41 | 124.4 | 68 | 74 | 350 | −35 |
| Comparative Example 4 | 6 | 48 | 51 | 94.1 | 65 | 68 | 1200 | −24 |
| Comparative Example 5 | 7 | 48 | — | — | 65 | — | 1200 | −24 |
| Comparative Example 6 | 8 | 48 | 51 | 94.1 | 65 | 68 | 500 | −35 |

As is apparent from the results in Table 2 above, samples Nos. 1 and 2 of the present invention each having the ratio of Young's Moduli of 100Eb/Ea of from 5 to 95% both were free from decrease of the output even after 12,000 thousands cycles pass in the running durability test and had good overwriting characteristic with the overwriting value of being −35 dB and −36 dB, respectively.

On the other hand, sample No. 3 of Comparative Example 1 had a too small value of 100 Eb/Ea, while having a higher Tgb than Tga, and therefore it had poor running durability. Samples Nos. 4 and 5 of Compara- 1. A magnetic recording medium, comprising a non-magnetic support; a non-magnetic layer comprising a non-magnetic powder and a binder resin, said binder resin comprising a vinyl chloride resin, a polyurethane resin and a polyisocyanate resin; and a magnetic layer comprising a ferromagnetic metal powder and a binder resin, wherein said non-magnetic layer is coated on said non-magnetic support; said magnetic layer is coated on said non-magnetic layer while said non-magnetic layer is still wet; said magnetic layer has a thickness of up to 0.6 μml said magnetic layer has a young's Modulus ranging from 94% to 95% of the Young's Modulus of said non-magnetic layer; said magnetic layer has a glass transition temperature lower than the glass transition temperature of said non-magnetic layer; wherein the magnetic recording medium is a disc-shaped magnetic recording medium; and said magnetic layer has an orientation ratio of at least 0.85, and wherein the Youngs Modulus. of the magnetic layer is greater than about $4.0 \times 10^4$ kg/cm$^2$.

2. The magnetic recording medium as claimed in claim 1, wherein said non-magnetic powder in said non-magnetic layer comprises carbon black.

3. The magnetic recording medium as claimed in claim 1, wherein said glass transition temperature of said magnetic layer is from 30° to 150° C., and said glass transition temperature of the non-magnetic layer is from 40° to 160° C.

4. The magnetic recording medium as claimed in claim 1, wherein said Young's Modulus of said magnetic layer is from $0.95 \times 10^4$ to $14.25 \times 10^4$ kg/cm$^2$, and said Young's Modulus of said non-magnetic layer is from $1 \times 10^4$ to $15 \times 10^4$ kg/cm$^2$.

5. The magnetic recording medium as claimed in claim 2, wherein said carbon black is present in said non-magnetic layer in an amount of from 0.1 to 30% by weight based upon total weight of said non-magnetic powder in said non-magnetic layer.

6. The magnetic recording medium as claimed in claim 1, further comprising carbon black located in said magnetic layer.

7. The magnetic recording medium as claimed in claim 6, wherein said carbon black is present in said magnetic layer in an amount of from 0.1 to 30% by weight based upon total weight of said ferromagnetic metal powder in said magnetic layer.

* * * * *